United States Patent [19]

Check et al.

[11] Patent Number: 4,644,125
[45] Date of Patent: Feb. 17, 1987

[54] D.C. MOTOR DRIVEN EDM HEAD

[75] Inventors: John M. Check, Chelsea; Gary F. Rupert, Ann Arbor, both of Mich.

[73] Assignee: Ex-Cell-O Corporation, Troy, Mich.

[21] Appl. No.: 778,824

[22] Filed: Sep. 23, 1985

[51] Int. Cl.⁴ ............................................. B23P 1/00
[52] U.S. Cl. ................................ 219/69 G; 219/69 W; 219/69 E
[58] Field of Search .................... 219/69 R, 68, 69 G, 219/69 S, 69 W, 69 E

[56] References Cited

U.S. PATENT DOCUMENTS

| | | | |
|---|---|---|---|
| 3,125,700 | 3/1964 | Bentley et al. | 219/69 R |
| 4,039,779 | 8/1977 | Rupert | 219/69 G |
| 4,191,878 | 3/1980 | Check et al. | 219/69 G |
| 4,361,745 | 11/1982 | Rupert et al. | 219/69 G |
| 4,423,302 | 12/1983 | Shimizu | 219/69 E |
| 4,436,976 | 3/1984 | Inoue | 219/69 G |
| 4,479,044 | 10/1984 | Inoue et al. | 219/69 E |

Primary Examiner—M. H. Paschall
Attorney, Agent, or Firm—John C. Evans

[57] ABSTRACT

An EDM head has a single servo-controlled electric motor and a high ratio gear system that drives a wire electrode during both an EDM machining operation and a wire erosion compensation operation. An associated control system can be programmed to selectively drive the electrode to compensate for wire erosion and to control blind hole breakout.

4 Claims, 4 Drawing Figures

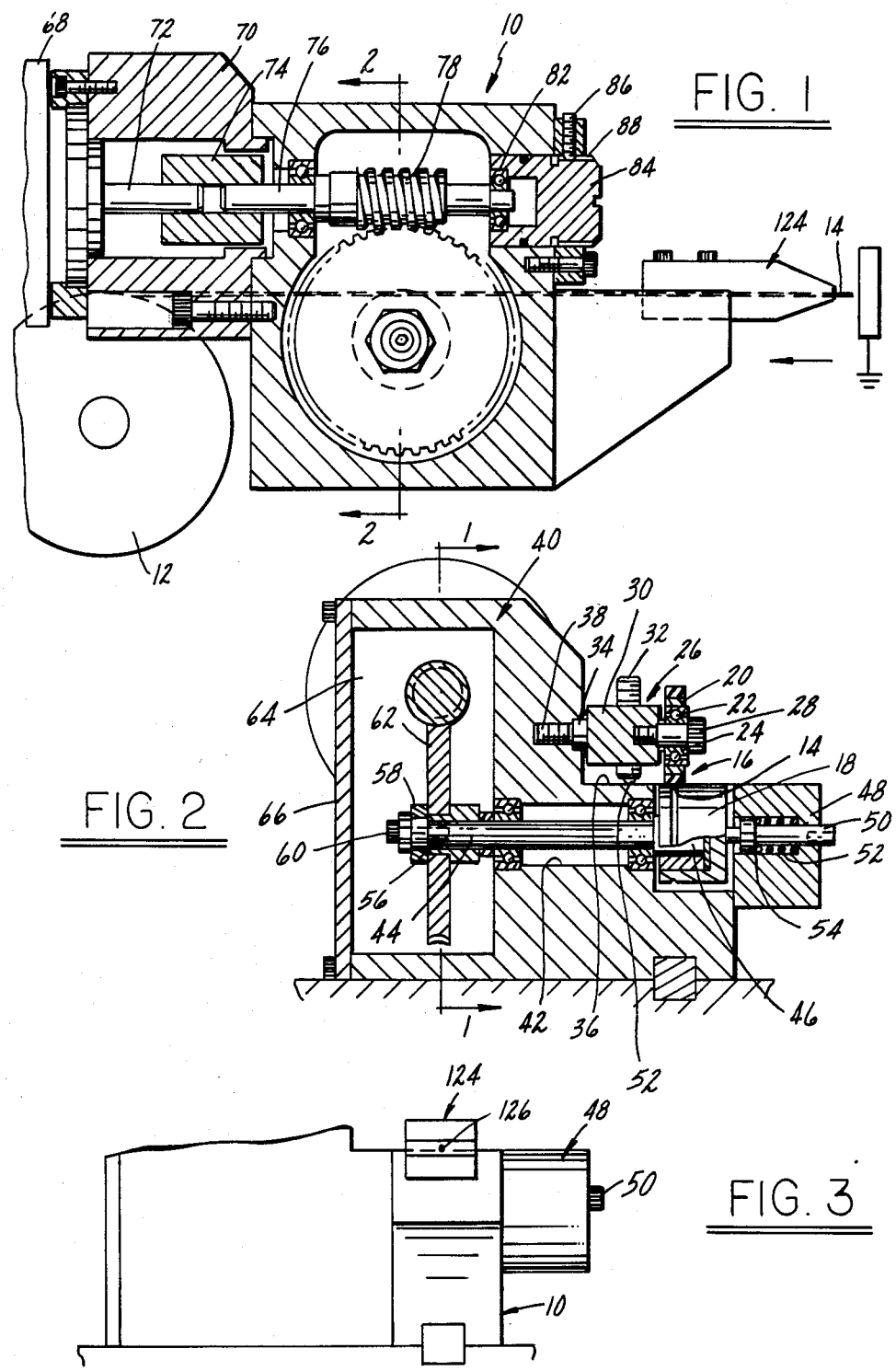

D.C. MOTOR DRIVEN EDM HEAD

BACKGROUND OF THE INVENTION

1. Field of the Invention

This invention relates to electrical discharge machining apparatus and more particularly to such apparatus having electrode management systems to compensate for electrode wear.

Various servo-controlled hydraulic and electric drive motors have been proposed for use in electrical discharge machining apparatus to position an electrode feed system in an anti-short position to produce a predetermined gap between the electrode and workpiece at initiation of an EDM feed cycle.

2. Description of the Prior Art

One such system is shown in U.S. Pat. No. 3,601,572 issued Aug. 24, 1971 for Electrode-Replenishing Apparatus for Electrical Discharge Machine. In such apparatus, a wire electrode spool is supported on a movable carriage which also carries a pair of electrode feed rollers which feed the wire from the spool during electrode replenishment.

The apparatus in U.S. Pat. No. 3,601,572 requires a separate hydraulic cylinder to produce a first "anti-short" movement of the roller carriage. Refeed of the electrode follows. When the electrode reaches the workpiece, movement of the roller carriage is reversed in an amount equivalent to the prior anti-short forward motion.

U.S. Pat. No. 3,531,616 discloses a servo control circuit for maintaining a constant gap between the tip of a fixed electrode and a workpiece which is subjected to electrical discharge machining.

U.S. Pat. No. 2,818,491 discloses a control means for compensating for wear of electrodes for grinding a workpiece; said control means having means for sensing gap changes and servo means that are driven in response to gap changes to compensate for electrode wear.

U.S. Pat. No. 4,361,745 discloses use of a microprocessor to control the machine operation of an electrical discharge machining apparatus.

U.S. Pat. No. 3,125,700 discloses a servo mechanism to adjust for electrode wear in an EDM machine by adjusting the position of an electrode holder in increments to maintain the servo mechanism in an optimum range for EDM operation.

Such prior art systems either do not provide for electrode erosion compensation or if compensation is provided, require use of at least two servo drives; one to move the electrode during a machining operation and the other to adjust the position of the electrode to compensate for its erosion during the machining operation.

SUMMARY OF THE INVENTION

An object of the present invention is to provide an EDM head with a single servo-controlled electric motor and a high ratio gear system that drives rollers to feed a wire electrode during both an EDM machining operation and a wire erosion compensation operation.

Another object of the present invention is to provide an EDM head with a single servo motor for wire feed which is controlled by a programmable microprocessor to establish preselected modes of electrode management including compensation for wire electrode erosion and control of electrode position during machining operations.

Still another object of the invention is to provide an EDM head in accordance with the preceding object wherein the servo motor is coupled to a high ratio gear set that drives a pair of wire feed rollers to precisely position a wire electrode to compensate for wire erosion and to control wire positioning during machining operations.

A still further object of the present invention is to provide an EDM head in accordance with either of the preceding objects wherein means are provided to drive rollers to remove any gear tooth lash from the drive train.

To accomplish the above objectives the apparatus includes a spool of wire on a fixed support. The fixed support also carries a single servo drive motor with an output shaft which is connected by an alignment coupling to a worm and worm gear that define a high ratio drive for a pair of rollers that position an EDM wire electrode. The ratio is selected to produce a rapid response to input signals from a programmable servo controller that controls the servo drive motor to refeed the wire to compensate for wire erosion. The servo motor is also controlled by a gap voltage servo controller to feed the wire during machining of a workpiece.

PRIOR ART STATEMENT

None of the aforesaid references have only one servo-controlled electric drive motor, associated controls, and a high ratio gear system to control the position of a wire electrode to maintain an operating workpiece gap while positioning the wire to compensate for electrode erosion during the machining operation.

BRIEF DESCRIPTION OF DRAWINGS

Other advantages of the present invention will be readily appreciated as the same becomes better understood by reference to the following detailed description when considered in connection with the accompanying drawing wherein:

FIG. 1 is a cross-sectional view of an EDM head including the present invention taken along the line 1—1 of FIG. 2 looking in the direction of the arrows;

FIG. 2 is a cross-sectional view of the EDM head of the invention taken along the line 2—2 of FIG. 1 looking in the direction of the arrows;

FIG. 3 is a fragmentary front elevational view looking in the direction of the arrow 3 in FIG. 1.

DESCRIPTION OF PREFERRED EMBODIMENT

Figure 4:
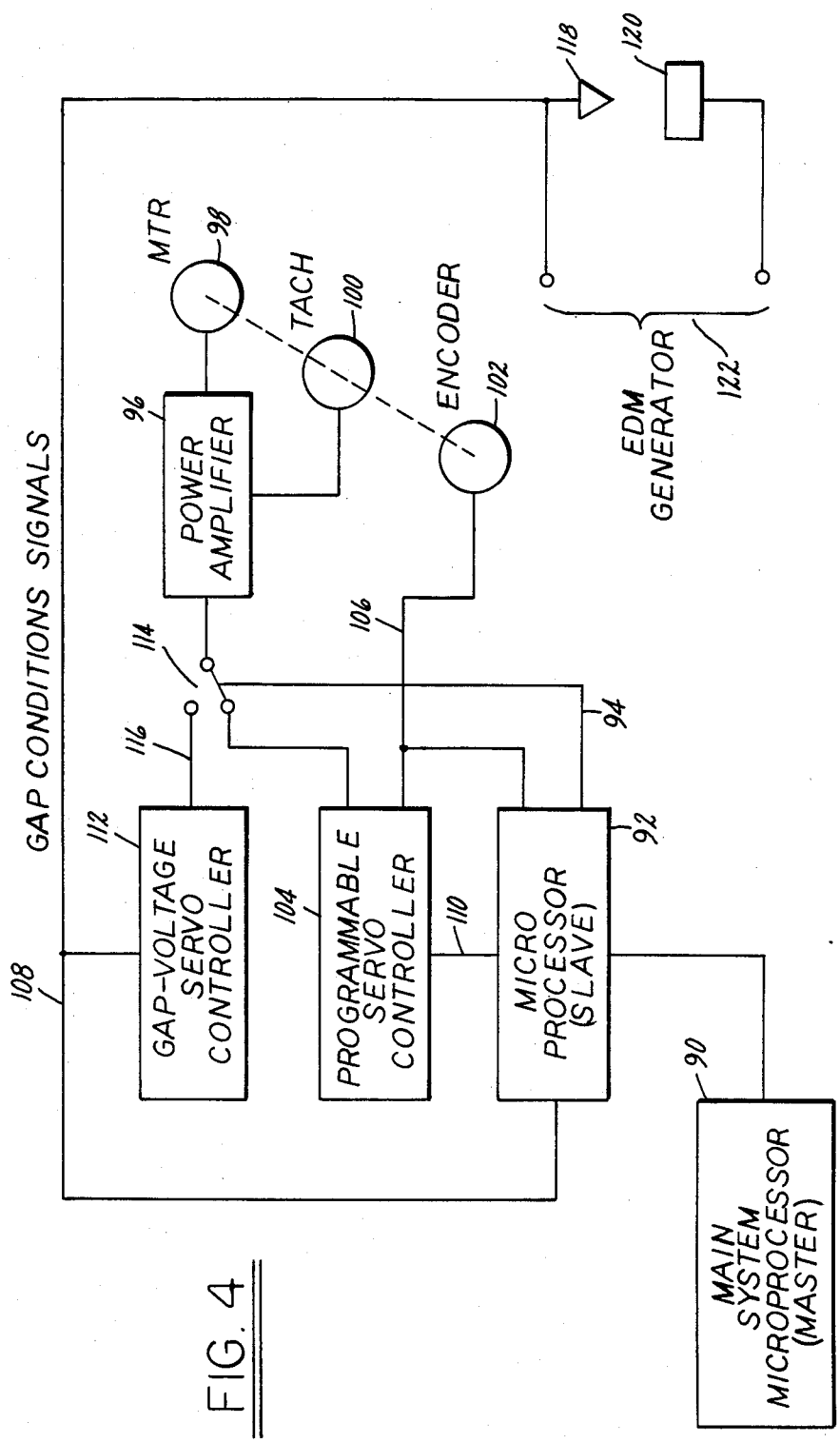
FIG. 4 is a circuit diagram, in block form, of an automatic control for the apparatus shown in FIGS. 1-3.

FIG. 1 shows an EDM head 10 suitable for incorporation in electro-discharge machining apparatus. The head 10 includes a supply spool 12 of wire electrode 14 which has its free end directed through a feed mechanism 16. The feed mechanism 16 includes a drive roller 18 and a rubber coated idler roller 20.

The idler roller 20 free wheels on a bearing assembly 22 having its inner race 24 secured on an adjustable mount 26 by a screw 28. The mount 26 has a movable part 30 positioned vertically by an adjustment screw 32 with a rounded nose 52 in engagement with a reference surface 36 on the head assembly 10. The mount 26 includes a fixed saddle portion 34 with a threaded extension 38 secured to a head body 40 of head 10.

Head body 40 has a transverse bearing support assembly 42 for rotatably supporting a cross-drive shaft 44 within the body 40. The outbound end 46 of shaft 44 is secured to the drive roller 18. The drive roller 18 is associated with a load block 48 that slidably supports a plunger 50. The inboard end of the plunger 50 is spring biased against roller 18 by a compression spring 52 captured in a recess 54 in the load block 48, as best seen in FIG. 2, to impose an axial thrust on shaft 44 in the inboard direction.

The inboard end 56 of the cross-drive shaft 44 is connected to a worm gear 62 by suitable fasteners shown as a washer 58 and screw 60.

The worm gear 62 is located in a gear cavity 64 formed in the head body 40 on one side thereof. The cavity 64 is closed by a cover 66 suitably sealed and fastened to the head body 40.

The worm gear 62 is driven by a servo drive in the form of a D.C. motor 68 attached to the aft end of head body 40 by a motor mount 70. The D.C. motor 68 has its output shaft 72 directed into an opening in the motor mount 70 where it is coupled by an alignment coupling 74 to the input end 76 of a worm element 78. The opposite end of the worm element 78 is supported by a bearing 82 in a bearing cup 84 held in place on the head body 40 by a set screw 86 seated in one of a plurality of serrations formed on the outer periphery of the cup 84.

In accordance with the present invention, the alignment coupling 74 and axial loading on cross-shaft 44 cooperate to define a positive drive path for efficiently transmitting the servo output to the drive roller 18.

Also, in accordance with the present invention, the worm 78 and worm gear 62 define a high ratio gear set to produce a precise adjustment of wire position in accordance with a predetermined number of revolutions of the servo motor 68 under the control of a circuit as shown in FIG. 4.

The control circuit of FIG. 4 includes a main system or master microprocessor 90 that can be programmed to operate a plurality of EDM heads of the type shown in FIGS. 1-3.

The master microprocessor 90 controls a microprocessor slave unit 92 (only one is shown, it being understood however that a plurality will be provided for multiple applications) for each EDM head or generator. The microprocessor slave unit 92 is programmed by the master microprocessor 90 to produce a desired electrical discharge machining operation by the EDM head 10. An EDM power generator 122 is connected to an electrode 118 and a workpiece 120. The electrode 118 corresponds to wire electrode 14 in the apparatus of FIGS. 1-3. The gap distance is controlled by a servo motor 98 which corresponds to motor 68 in the apparatus of FIGS. 1-3.

Power amplifier 96 is controlled by the microprocessor slave unit 92 to produce a pre-programmed drive of the wire electrode to carry out desired machine strokes, compensate for wire erosion and prevent back-side breakthrough in parts having blind holes.

More particularly, the electrical discharge machining generator 122 is controlled by process control means including micro-processors 90, 92 capable of receiving a plurality of operation instructions regarding EDM parameters and issuing operation commands to execute the operation instructions to control the machining of a workpiece. The process control means receives operation instructions regarding EDM parameters such as the on time for an electrical discharge (machining spark), the time period between sparks, the current level, and other EDM-related parameters. These operation instructions are acted upon by the microprocessor to control the EDM power supply. The microprocessor continuously monitors the operation of the apparatus and issues the appropriate operation commands needed to complete a machining process on a workpiece. For instance, the microprocessor controls pulse timer and control logic circuits generating the appropriate logic pulse which drives the power output circuits at the appropriate power level and polarity which also are established as a result of the operation instructions having been inputted in the microprocessor, all as more specifically set forth in U.S. Pat. No. 4,361,745, assigned to the assignee of this case, the specification of which is incorporated by reference herein.

The process control means of this invention also incorporates gap sensing circuits 115 and a digitally controlled servo system 125. The gap-sensing circuits sense electrical conditions present at the working gap and provide status signals via data bus 108 to the microprocessor 92 to control subsequent machining sparks and to control the servo system for control of the movement of the electrode. The gap-sensing circuits 115 and the servo system 125 cooperate when machining is initiated to advance the electrode toward the workpiece at a rapid rate. When the gap-sensing circuits detect the first machining spark across the working gap, the servo system is switched to a slower feed rate at which machining is carried out.

The following description of operation assumes that at the onset of the EDM operation, the microprocessor 92 will set analog switching devices (not shown) to provide for fast rate of feed of the electrode 118 toward the workpiece 120.

When the electrode 118 is in close relationship with the workpiece 120 and the first spark crosses the gap, the circuit 115 will sense the close position of the electrode 118 to the workpiece 120 and generate a signal that is transmitted to the microprocessor 92 which responds by resetting the analog switches to continue machining at a slower feed rate.

The programmable servo controller 104 is set to establish the working gap between the workpiece 120 and the electrode 118 while the gap voltage servo controller 112 determines the rate at which the electrode 118 is moved to achieve the desired gap voltage and therefore the desired working gap distance. In other words, both the advancement and retraction of the electrode 118 is adjusted to maintain the desired working gap.

When machining is completed, the microprocessor 92, upon receipt of a signal from an EDM off sensor (not shown), closes a switch 114 connecting a voltage to the amplifier 96 which causes the D.C. motor 98 to operate in a manner to retract the electrode 118 at a rapid rate. The voltage on the switch 114 has a polarity opposite to the gap voltage and is sufficiently large to override any voltage that may be generated by the response control circuit 115 that advances the electrode 118.

The servo system 125 includes a tachometer 100 that produces a feedback signal to the power amplifier to establish the desired electrode movement to maintain gap conditions to meet pre-programmed EDM machining objectives. Also, an encoder 102 directs a signal of actual D.C. motor positioning of the wire electrode. This signal is utilized by the servo controller 104 to establish optimal and efficient EDM machining operation. The position signal can also be utilized by the slave microprocessor to reprogram the servo controller during machining operation.

Also, the encoder signals of electrode position can indicate wear of the electrode. This information can be utilized in pre-programmed management operations that will produce a predetermined adjustment of the length of the wire to compensate for wire wear during the EDM machining operation.

The controller, for example, can be operated to produce the following control of electrode position to compensate for wear.

(1) Servo motor drives electrode to produce a forward electrode movement until the electrode is shorted.
(2) Servo motor drive control reverses to produce a wire electrode anti-short gap.
(3) Servo motor drive controls to produce a full depth, total EDM machining stroke movement of the head.
(4) Servo motor drive controlled to produce a return of the electrode to a retracted position.
(5) Step one repeated.

What is claimed is:

1. An EDM machine combining workpiece machining by spark erosion and wire erosion compensation comprising: a base, a stationary supply of wire disconnected from said motor for supplying predetermined lengths of electrode wire, and a wire guide on said base, said electrode wire being moveable to and from said supply and relative to said wire guide, a drive roller engageable with said wire for moving it with respect to said wire guide and with respect to a workpiece outboard of said wire guide, a servo-controlled electric motor, drive gear means for coupling said servo-controlled electric motor to said drive roller, said servo-controlled electric motor constituting the sole means in said machine for advancing said electrode with respect to the workpiece wherein the electrode is advanced only when said motor is energized either during spark erosion machining of a workpiece or during a wire erosion compensation of the length of said electrode, means for controlling said motor to drive said drive roller so as to feed said electrode wire from said supply and through said guide during spark erosion thereby to maintain a predetermined gap between said electrode wire and a workpiece during spark erosion machining of the workpiece, and means including encoder means coupled to said servo-controlled electric motor for indicating wear of said electrode wire during such spark erosion machining; and means responsive to said encoder means to control said motor to modify the drive of said drive roller to regulate wire feed to and from said supply so as to compensate for such wire erosion.

2. In the combination of claim 1, a programmable microprocessor and power amplifier means to selectively energize said servo-controlled electric motor to position a wire electrode to produe preselected modes of electrode management including compensation for wire electrode erosion and control of electrode position during machining operations.

3. In the combination of claim 1, spring means connected with said drive roller to remove gear tooth lash from said drive gear means.

4. In the combination of claim 1, a fixed support, a spool of wire on said fixed support, said servo drive motor connected to said fixed support, an alignment coupling, said drive gear means including a worm and worm gear, said output shaft coupled by said alignment coupling to said worm, means for connecting said pair of rollers to said worm gear, means including a programmable servo controller for controlling the servo drive motor to refeed said wire to compensate for wire erosion, and means including a gap voltage servo controller to control feed of the wire during machining of a workpiece.

* * * * *